United States Patent
Tompkins

[11] 3,855,465
[45] Dec. 17, 1974

[54] APPARATUS FOR INSPECTING TUBULAR GOODS

[75] Inventor: David R. Tompkins, Houston, Tex.

[73] Assignee: Plastic Applicators, Inc., Houston, Tex.

[22] Filed: Oct. 14, 1971

[21] Appl. No.: 189,306

[52] U.S. Cl. .................. 250/71.5 R, 250/83.3 D
[51] Int. Cl. ............................................. G01t 1/20
[58] Field of Search .................. 250/71.5 R, 83.3 D

[56] References Cited
UNITED STATES PATENTS

| | | | |
|---|---|---|---|
| 2,964,630 | 12/1960 | Bosch | 250/83.3 D |
| 3,066,254 | 11/1962 | Price et al. | 250/83.3 D |
| 3,027,459 | 3/1962 | Alcock et al. | 250/83.3 D |

Primary Examiner—James W. Lawrence
Assistant Examiner—Davis L. Willis
Attorney, Agent, or Firm—Ernest R. Archambeau, Jr. et al.

[57] ABSTRACT

In the new and improved radiation apparatus disclosed herein for inspecting tubular goods, a uniquely-arranged radiation detector is coaxially positioned within a tubular member being axially translated along a selected inspection axis for receiving radiation from a collimated radiation emitter facing the detector and rotating around the exterior of the tubular member. In the preferred embodiment disclosed herein, this unique radiation detector includes a radioactivity-responsive scintillation crystal having a central portion thereof selectively shaped so that radiation intersecting this portion of the detecting crystal will provide a selectively-reduced response which will be substantially equal to the responses obtained when a radiation beam intersects the undisturbed outer portions or sides of the crystal. In this manner, as lateral movements of the detector to one side or the other of the inspection axis bring the undisturbed active portions of the detector into the radiation beam, a substantially-constant output will be produced by the detector when it is at any position within a selected boundary around the inspection axis so that random or erratic shifts of the detector within the moving tubular member will not affect the accuracy of the measurements being obtained.

16 Claims, 5 Drawing Figures

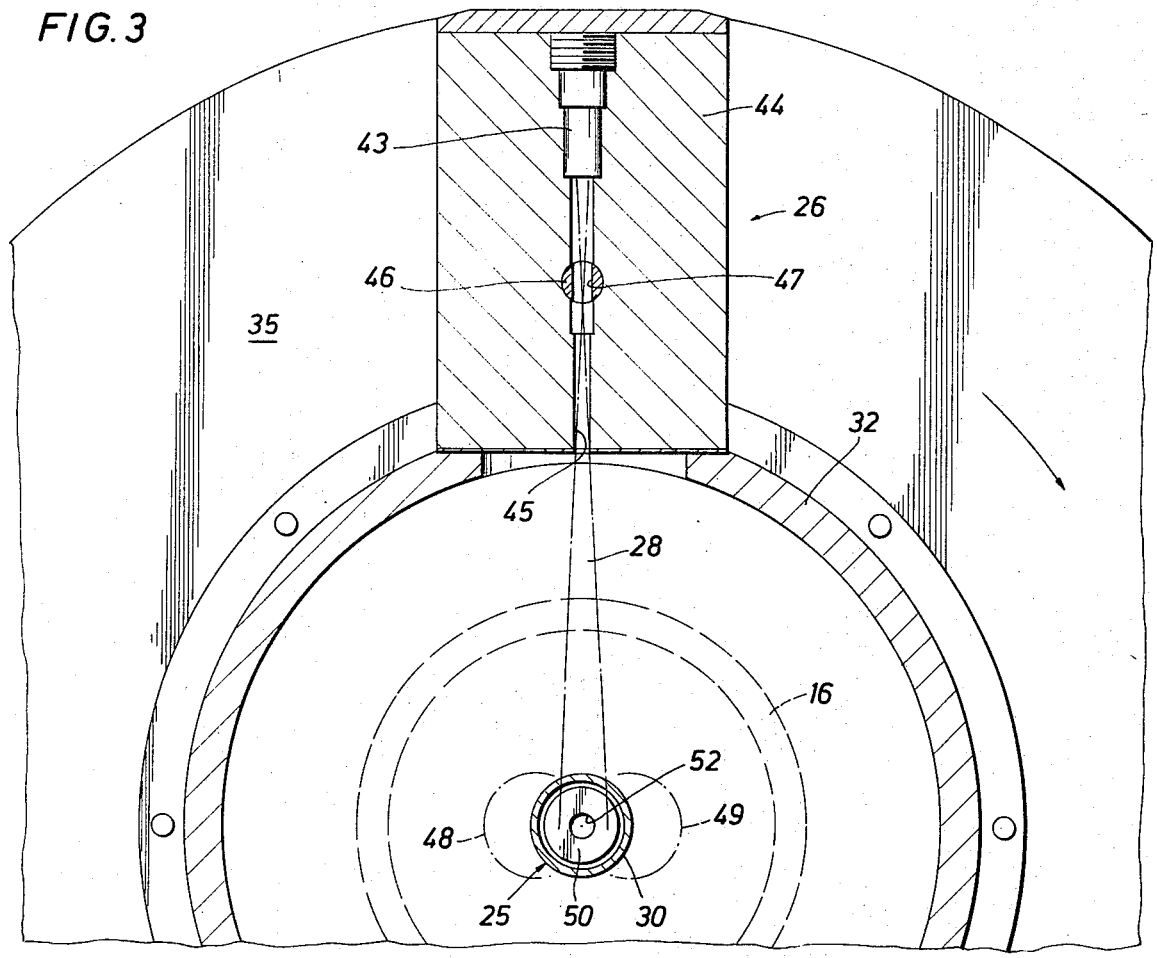
FIG. 3
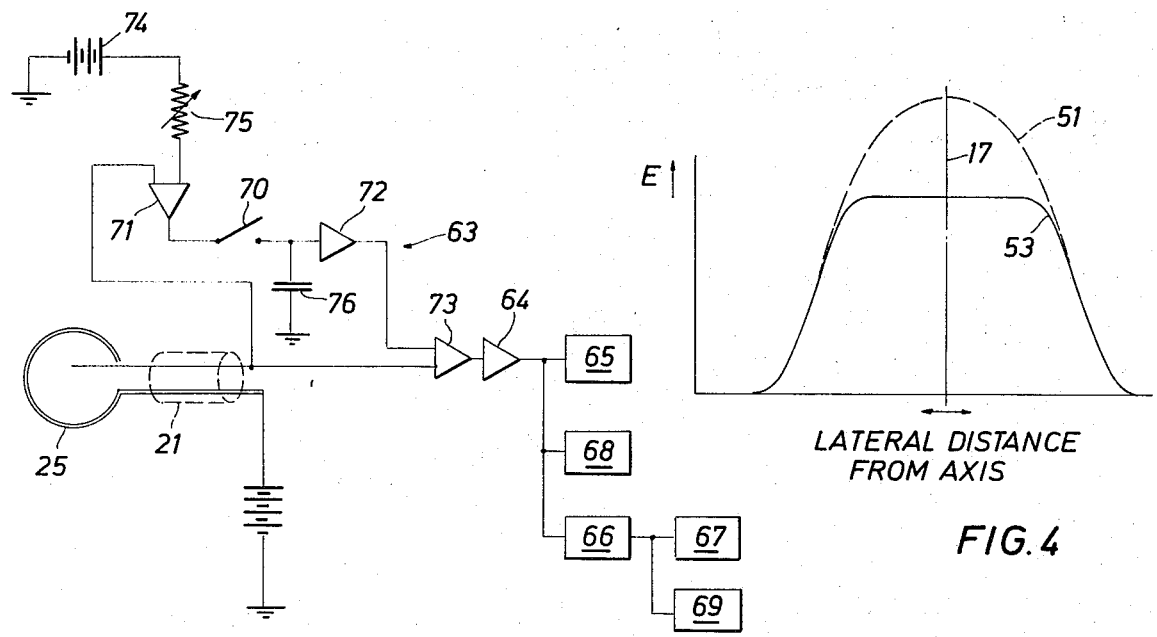
FIG. 5
FIG. 4

APPARATUS FOR INSPECTING TUBULAR GOODS

Elongated tubular goods, such as oil-field piping or tubing and the like, are frequently inspected for hidden flaws and other latent defects that might cause failure of such tubular members while in service. As one aspect of such inspections, it is often desired to also obtain representative measurements of wall thickness of such tubular members at spaced points along their length. It will be recognized, of course, that such thickness measurements must be obtained at several points around the circumference of a pipe as well as along its entire length to be certain of reliably detecting imperfections.

Various thickness-measuring devices have, of course, been devised heretofore for inspecting long lengths of pipe and tubing. For instance, the new and improved inspection device disclosed in copending patent application, Ser. No. 744,861 filed July 15, 1968, has been found to provide accurate thickness measurements of various tubular goods at efficient inspection rates. As described in that application, a radiation detector is mounted on the free end of a fixed, but relatively flexible, elongated lance that is aligned along a selected inspection axis and adapted to receive a tubular member being moved axially along the axis. A radiation source is suitably mounted for rotation at high speeds around the exterior of a tubular member moving along the inspection axis. By means of a unique arrangement of converging focussing slots, a sharply-defined radiation pattern substantially smaller in area than the active portion of the radiation detector is imposed thereon. In this manner, limited lateral or vertical movements of the radiation detector confined within the moving tubular member being inspected will produce only a negligible effect on the measurements provided by the radiation detector.

Although this new and improved inspection apparatus has proven to be successful in certain situations, it has been found that the extreme narrowness of its radiation pattern restricts the use of a given unit to the inspection of tubular members within only a limited range of diameters. Moreover, it has been found that tubular members being inspected with this apparatus have to be retained as nearly as possible in coincidental alignment with the inspection axis of the apparatus to assure maximum accuracy. Thus, in view of these two limiting factors, the inspection of elongated tubular members which are slightly bent or the inspection of groups of such members of widely-varying diameters require special operating and handling techniques which correspondingly reduce the efficiency of the inspection operation.

Accordingly, it is an object of the present invention to provide new and improved radiation apparatus for accurately and quickly measuring the wall thickness of elongated tubular members, such as oil-field tubular goods, of widely-different diameters as well as such elongated members having minor bends or discontinuities along their length.

It is still another object of the invention to provide a new and improved radiation thickness-measuring system for inspecting axially-moving tubular members in which random motions of a radiation detector positioned within the members do not impair the quality of the measurements.

These and other objects of the present invention are attained by mounting new and improved radiation-detecting means in general alignment along a selected inspection axis for reception in a tubular member moving axially along this axis. Radiation-emitting means adapted for rotation about the inspection axis are cooperatively arranged for directing a narrow radiation beam which intersects the inspection axis. By selectively removing a central part of the active portion of the radiation detector, the response of the detector is selectively adjusted so as to be substantially uniform regardless of whether the radiation beam is directly intersecting the central portion of the detector or is striking only one or the other of the two sides of the detector element. In this manner, upon rotation of the radiation-emitting means about a tubular member of given thickness, the total flux (i.e., total radiation energy in roentgens per unit of time, for example) of the radiation passing through the intervening wall of the tubular member and intercepted by the radiation-detecting means will remain substantially constant irrespective of even significant variations in either the spacing or alignment between the radiation-emitting means and the radiation-detecting means.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 schematically illustrates thickness-measuring apparatus employing the radiation means of the present invention as it may be arranged for cooperation with typical flaw-inspection apparatus;

FIG. 3 is an enlarged cross-sectional view taken along the lines 3—3 in FIG. 2 and depicts a preferred embodiment of radiation-detecting means arranged in accordance with the principles of the present invention;

FIG. 4 is a graphical representation illustrating the performance of the new and improved radiation means of the present invention; and FIG. 5 is a schematic block diagram of a preferred arrangement of electronic circuitry for use with the thickness-measuring apparatus illustrated in FIGS. 1 and 2.

Figure 1:
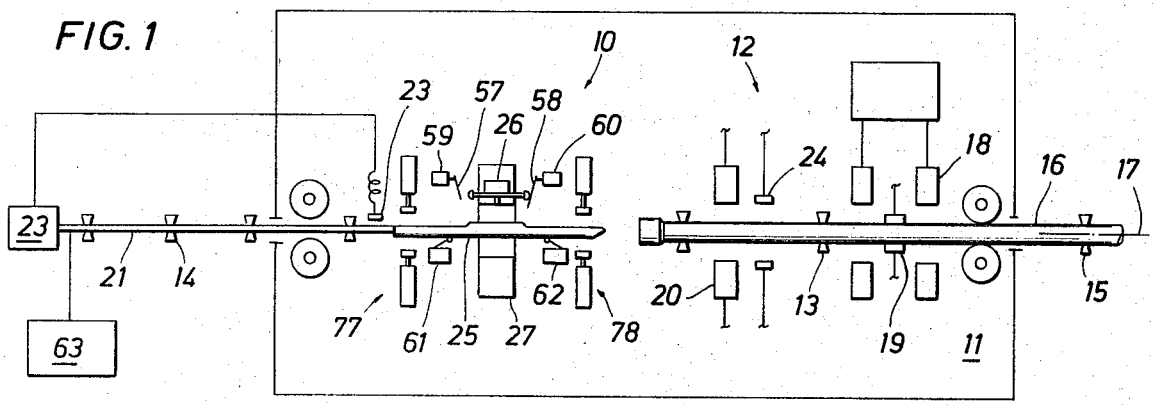

Turning now to FIG. 1, a schematic plan view is shown of new and improved thickness-measuring apparatus 10 arranged in accordance with the present invention and operatively mounted within a vehicle 11. To illustrate a typical situation in which the new and improved apparatus 10 can be advantageously used, the thickness-measuring apparatus is depicted as being axially aligned with other pipe-inspection apparatus 12 such as the flaw-inspection apparatus disclosed in U.S. Pat. No. Re26,537. As is typical, the thickness-measuring apparatus 10 includes pipe-translating means, such as a selectively-powered conveyor 13 (which may be the conveyor shown in U.S. Pat. No. 3,565,310) mounted within the vehicle 11 and a pair of portable conveyors 14 and 15 (such as those disclosed in U.S. Pat. No. 3,250,404) arranged at the opposite ends of the vehicle, for selectively moving pipe sections as at 16 back and forth through the vehicle along a generally-horizontal inspection axis 17.

Reference should be made, of course, to the aforementioned reissue patent for elaboration of the details of the flaw-inspection apparatus 12 and the particulars of its operation. However, the general arrangement of the flaw-inspection apparatus 12 and a typical inspection operation therewith should be understood to better appreciate its cooperation with the new and improved apparatus of the present invention. In general, the flaw-inspection apparatus 12 is arranged to first progressively induce a longitudinally-oriented magnetic flux in a horizontal pipe, as at 16, being advanced axially in a first direction along the conveyor 13 so that transversely-oriented flaws in the pipe can be concurrently detected. Residual magnetism remaining in the pipe 16 is at least partially reduced by progressively subjecting the advancing pipe to a demagnetizing flux after it has been inspected for transversely-oriented flaws. When the pipe 16 is also to be inspected for longitudinally-oriented flaws, the pipe is moved onto the conveyor 14 and, after being halted, subjected to a circumferentially-oriented magnetic field. Thereafter, as the pipe 16 is returned in the opposite direction along the inspection axis 17, it is progressively inspected for longitudinally-oriented flaws. On the other hand, when this latter inspection is not performed, the pipe 16 is merely returned back through the vehicle 11 to the conveyor 15. In either situation, however, it is preferred that the new and improved thickness-measuring apparatus 10 be arranged for operation upon the return movement of the pipe 16 whether or not the latter flaw inspection is conducted.

To perform these inspections for transverse flaws, the inspection apparatus 10 preferably includes an annular coil 18 having spaced sections concentrically arranged around the inspection axis 17 with a plurality of flux-detecting heads 19 arranged therebetween. A second annular coil 20 is also concentrically arranged around the inspection axis 17 to the rear of the flux-inducing coil 18 and connected to a suitable AC or pulsating DC source (not shown) for progressively demagnetizing the pipe 16 as it leaves the flux-inducing coil.

The flaw-inspection apparatus 12 includes an electrically-conductive, cantilevered elongated probe or lance 21 that is supported at its remote end and maintained in substantially-coincidental alignment along the inspection axis 17. When the pipe 16 is to be inspected for longitudinal flaws, it is advanced onto the lance 21 and halted when the lance has passed completely through the pipe and its free end projects out of the rearward end of the pipe. To subject the pipe 16 to a circumferentially-oriented magnetic field, a DC source 22 is connected between the remote supported end of the lance 21 and one or more laterally-movable electrical contacts 23 that are selectively engageable with the free end of the lance. Thereafter, as the pipe 16 is being returned, a plurality of flux-detecting heads 24 are selectively moved into contact with and coaxially rotated about the moving pipe for detecting generally-longitudinal flaws therein. As previously mentioned, it is preferred to operate the new and improved thickness-measuring apparatus 10 as the pipe 16 is withdrawn from over the lance 21 whether or not the pipe is to be inspected for longitudinal flaws.

Figure 2:
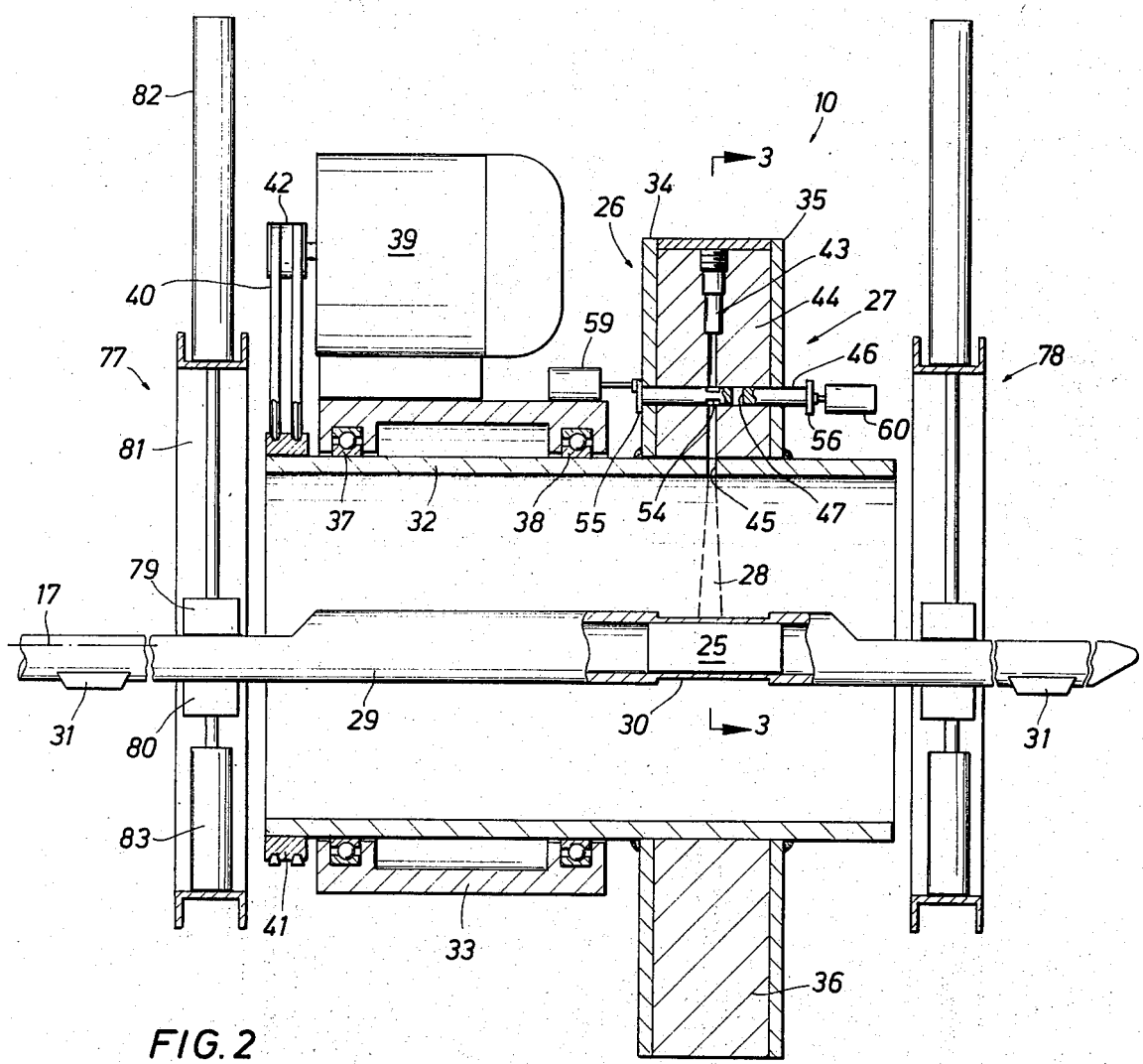
FIG. 2 is an elevational view, partially in cross-section, of a preferred arrangement of the thickness-measuring apparatus depicted in FIG. 1.

In general, as depicted in FIGS. 1 and 2, the thickness-measuring apparatus 10 is comprised of new and improved radiation-detecting means including a radiation detector 25 operatively positioned along the axis 17 and radiation-emitting means 26 mounted on a body 27 adapted for rotation about the inspection axis and operatively arranged for producing a narrow inwardly-directed beam of radiation 28 of a predetermined intensity which, upon passing through the wall of the pipe 16, will intersect the inspection axis for intercepting the radiation detector.

As illustrated in FIG. 2, the radiation detector 25 is mounted in a suitable protective housing 29 carried on the free end of the elongated probe 21. To adapt the detector 25 for movement relative to the lower internal wal of the pipe 16 as it is axially advanced or returned along the inspection axis 17, the protective housing 29 includes a central tubular portion 30 of nylon, or the like, that will not significantly attenuate incident radiation. In he embodiment illustrated in FIG. 2, a plurality of removable centralizing members, as at 31, are spaced circumferentially about the end portions of the detector housing 29 for retaining the detector 25 in general coincidental alignment with the inspection axis 17. For convence the centralizers 31 are adapted to be exchanged with other centralizers (not shown) of different heights so that the inspecion apparatus 10 will be effective for specting a wide range of sizes of tubular members. As will be subsequently explained, by arranging the radiation detector 25 to produce a reduced response of selected magnitude when the detector is directly intersected by the radiation beam 28 which is substantially equal to the response of the detector when the radiation beam impinges on one side or the other of the detector, the radiation detector will produce a uniform output signal even when it is eccentrically disposed in relation to the inspection axis 17.

In the preferred embodiment of the thickness-measuring apparatus 10 shown in FIG. 2, the radiation detector 25 is mounted on the free end of the lance 21 and coaxially positioned within the rotating body 27 which includes a horizontal, generally-tubular member 32 having one end rotatably journalled within an enlarged, annular stationary housing 33 and adapted for high-speed rotation around the longitudinal inspection axis 17. The radiation means 26 are eccentrically located between two longitudinally-spaced annular plates or flanges 34 and 35 secured to the unsupported or other end of the rotatable member 32. To dynamically balance the rotating body 27, a target 36 of sufficient mass is mounted between the spaced flanges 34 and 35 diametrically opposite of the radiation means 26.

As best seen in FIG. 2, the rotating body 27 is concentrically arranged about the horizontal inspection axis 17 and journalled within the housing 33 by a pair of longitudinally-spaced bearings 37 and 38 carrying the supported end portion of the tubular member 32. To drive the rotating body 27 at high speeds about its rotational axis 17, the supported end of the tubular member 32 extends beyond the outboard bearing 37 and is coupled to driving means, such as a motor 39 mounted outside of the housing 33, by a suitable power transmission such as a typical chain or belt 40 operatively interconnecting a pulley 41 mounted on the tubular member and a pulley 42 mounted on the shaft of the motor.

The radiation-emitting means 26 include a radiation source 43 (such as Cobalt 60, Cesium 137, or other acceptable sources of gamma radiation), which is mounted in a block 44 of a suitable radiation shielding material supported between the flanges 34 and 35 diametrically opposite the counterbalancing mass 36. The source 43 is disposed adjacent to the outer end of an inwardly-directed radiation passage 45 formed in the block 44 along an axis calculated to intersect the inspection axis 17. As will subsequently be explained in greater detail, a radiation-blocking shutter bar 46 having an aperture 47 therein is operatively arranged in the shielding block 44 for selectively controlling the passage of radiation from the source 43 to the detector 25.

It will be noted from FIG. 3 that the radioactive source 43 and the radiation passage 45 are cooperatively arranged to direct the beam of radiation 28 along a radial radiation axis intersecting the inspection axis 17. Of paramount significance to the present invention, it will be noted that, as indicated by the dashed circles 48 and 49, the detector 25 is capable of moving laterally on opposite sides of the inspection axis 17 within the pipe 16. Thus, only so long as the detector 25 is coincidentally aligned with the inspection axis, the radiation beam 28 will be uniformly impinged on radiation-sensitive means, such as a scintillation crystal 50 of unique design which is cooperatively arranged within the detector; and, in the other positions of the detector (as at 48 and 49), the radiation beam will be unsymmetrically aligned in relation to the active portion of the crystal. It will be appreciated, therefore, that since the output of the scintillation crystal 50 is directly related to the intensity of the radiation beam 28 as well as to the total effective cross-sectional area of the active portion of the crystal which is being irradiated at any given time, the lateral position of the detector 25 in relation to the inspection axis 17 would significantly affect the output of the detector as shown at 51 in FIG. 4 unless the principles of the present invention are followed.

Accordingly, in keeping with the objects of the present invention, the detector 25 is uniquely arranged to provide a uniform output signal for a given flux of the radiation beam 28 over a wide range of lateral movements of the detector within the pipe 16 on either side of the inspection axis 17. In the preferred manner of accomplishing this unique result, the scintillation crystal 50 is selectively shaped so as to make the effective volume of its active portion which is intersected by the radiation beam 28 when the detector 25 is coincidentally aligned with the inspection axis 17 substantially equal to the effective volume of the active portion which is intersected by the beam when the detector is on either side of the inspection axis. Thus, as shown in FIG. 3, where the scintillation crystal 50 is a cylinder, a longitudinal bore 52 is symmetrically formed therein for removing a sufficient volume from the central portion of the crystal to achieve a selected reduction in the output response of the crystal when it is coincidentally aligned with the axis 17. As best seen in FIG. 4, therefore, the crystal 50 is selectively hollowed in a symmetrical fashion to obtain an output response similar to that illustrated at 53. It will, of course, be appreciated that the particular dimensions of the axial bore 52 will be wholly dependent upon the physical size of the crystal 50 as well as the range of lateral movement of the detector 25 and the intensity and width of the radiation beam 28 at the axis 17.

Accordingly, as schematically represented in FIG. 4, at a given energy level or intensity for the radioactive source 43, the detector 25 will respond to irradiation from the source as graphically depicted by the response curve 53. As represented there, so long as the detector 25 remains coincidentally aligned with the inspection axis 17, the maximum intensity of the radioactive source 43 will be received thereby so as to produce the reduced output as represented by the center of the flat portion of the response curve 53. On the other hand, lateral movement of the detector 25 to either one side or the other of the inspection axis 17 will progressively diminish the radiation intensity being received from the source 43 by the detector but a substantially equal output will be produced as represented by the outer portions of the flat-top curve portion. A correspondingly-reduced output signal (as generally indicated by the flank portions of the response curve 53 that asymptotically approach the distance axis on either side of the curve) will, of course, be produced should the detector 25 move outwardly beyond either of its eccentric positions 48 or 49.

It will be appreciated, therefore, that the new and improved radiation detector 25 of the present invention will produce a substantially-uniform output signal for a given thickness of metal between the radiation source 43 and the detector so as to at least minimize the effects which would otherwise be caused by lateral shifting of the detector within the pipe 16. It should also be noted that even though the detector 25 may bounce upwardly and downwardly (vertically as viewed in FIG. 3) as the pipe 16 is being moved thereover, the new and improved radiation detector of the present invention will also provide substantially-uniform signals over an acceptable range of vertical movement of the detector inasmuch as the radiation beam 28 is well collimated and the sides of the beam are relatively parallel so that its flux density will be substantially equal at different vertical positions within the expected range of vertical movement of the detector.

It has been found that where typical oil-field tubular goods are being inspected, the efficiency of the new and improved thickness-measuring apparatus 10 is significantly improved where the radioactive source 43 is selected for producing a substantial count rate at the detector 25 in the order of $10^6$ to $20^6$ counts per second as a tubular member is being inspected. With count rates of this magnitude, it will be appreciated that the detector 25 will be operated at optimum statistical accuracy so that pipes, as at 16, can be moved through the inspection apparatus 10 at reasonably-high axial speeds without unduly compromising the accuracy of the resulting thickness measurements.

Since such high count rates are produced while there is an intervening pipe wall between the source 43 and the detector 25, the detector will, of course, be subjected to much-greater count rates when a pipe is not positioned over the detector. It has been found, however, that with even the highest-quality radioactivity detectors, the prolonged exposure of the detector 25 to such greatly-increased count rates will rapidly cause the detector to begin drifting and that this drift or error is accelerated at an exponentially-increasing rate so long as the exposure is continued. Moreover, it has been found that even brief direct exposures of even a high-quality radioactivity detector to such greatly-increased count rates will quickly initiate unreliable or unstable operation of the detector 25 which will not be corrected until the detector has been inserted into a pipe for a considerable period of time. Such unpredictable operation of the detector 25 will, of course, either result in unreliable measurements being obtained or make it necessary to delay the inspection of another pipe until the detector has again stabilized.

Accordingly, as described in more detail in a copending application, Ser. No. 22,935 filed Mar. 26, 1970, the shutter bar 46 is operatively arranged for selectively attenuating the radiation beam 28 at all times that a pipe, as at 16, is not positioned over the detector 25. Thus, by reducing the intensity of radiation intercepted by the detector 25 to at least a reduced level that will not create the aforementioned unstability or drifting of the detector, the new and improved thickness-measuring apparatus 10 can be operated at efficient inspection rates without compromising the accuracy of the resulting measurements.

Referring again to FIGS. 2 and 3, it will be noted that the shutter bar 46 is arranged for sliding movement within a transversely-disposed complementary passage formed in the block 44 for intersecting the radiation passage 45. In the preferred embodiment of the thickness-measuring apparatus 10, this intersecting passage is parallel to the inspection axis 17 and the elongated rod or bar 46 is of sufficient length that its ends will project outwardly from the forward and rearward faces of the flanges 34 and 35. As best seen in FIGS. 2 and 3, the aperture 47 in the shutter rod 46 is formed in a similar or identical cross section as the radiation passage 45 to permit the ready passage of radiation when the rod opening is in registration with the radiation passage. In the preferred embodiment of the shutter bar 46, a second portion, as at 54 of the bar is formed to have a thickness of a selected and predetermined dimension so that when this reduced portion of the bar is aligned with the radiation passage 45, the radiation intercepted by the radiation detector 25 will be reduced to produce a selected count rate at the detector. It will be recognized, of course, that to attain the objects of the present invention, the obturating portion 54 of the bar 46 could be alternatively adapted to obstruct most of the radiation emitted by the source 43.

In either event, the new and improved thickness-measuring apparatus 10 is operatively arranged for selectively moving the shutter rod 46 to bring the radiation opening 45 into registration with the radiation passage 45 just as the leading end of the pipe 16 approaches the detector 25 and then repositioning the rod to bring its obturating portion 54 back into the radiation passage 45 as the trailing end of the moving pipe passes over the detector. It will be appreciated, therefore, that the alternately-directed movements of the shutter bar 46 between its two operating positions will assure that the detector 25 will be protected from exposure to excessive radiation intensities that could otherwise create the aforementioned problems with unstability or drifting of the detector.

In the preferred manner of accomplishing these alternately-directed movements of the shutter bar 46, and as disclosed and claimed in a copending application, Ser. No. 22,933 filed Mar. 26, 1970, rounded knobs, as at 55 and 56, are mounted on the outer ends of the rod. Since the rod 46 will follow a circular path upon rotation of the rotating body 27, straps, as at 57 and 58 (FIG. 1), of the relatively-flexible material are respectively secured to the forward and rearward portions of the housing 33 and operatively arranged for pivotal movement from first positions away from the housing to second positions immediately adjacent thereto which respectively intercept the paths of rotation of the forward and rearward knobs 55 and 56. Selectively-operable solenoid actuators 59 and 60 are arranged adjacent to the straps 57 and 58, respectively, and so located that, upon energization of the first actuator 59, the strap 57 will be moved into the rotational path of the knob 55 and will accordingly shift the shutter rod 46 to the position illustrated in FIG. 2 before the rotating body 27 completes a full revolution. Conversely, by energizing the second actuator 60, the shutter rod 46 will be quickly shifted in the reverse direction to its alternate position for opening the radiation passage 45. In the preferred embodiment of the thickness-measuring apparatus 10, the selective operation of the solenoid actuators 59 and 60 is accomplished by arranging typical limit switches, as at 61 and 62 in FIG. 1, for contact by the pipe 16 as it passes along the conveyor 13 to shift the shutter rod 46 back and forth in proper coordination with the operation of the thickness-measuring apparatus.

It will, of course, be appreciated that as far as the requirements of the present invention are concerned, circuitry such as that shown in FIG. 8 of U.S. Pat. No. 3,565,310 can be efficiently employed for the new and improved thickness-measuring apparatus 10. In the preferred embodiment of the thickness-measuring apparatus 10, it is preferred, however, to employ new and improved circuitry such as schematically depicted at 63 in FIG. 5 of the present application and described in greater detail in application Ser. No. 22,935 filed Mar. 26, 1970. In general, the circuitry 63 is uniquely arranged so that each time the shutter rod 46 is in its radiation-blocking position, a calibration measurement is made of the thickness of the obturating portion 54 of the rod. Then, as a pipe, as at 16, is being inspected, the resulting thickness measurements being obtained are compared with the previously-obtained calibration measurement for determining the accuracy of these thickness measurements.

As described in greater detail in the aforementioned application, the circuitry 63 is appropriately arranged for converting the output signal of the radiation detector 25 to a meaningful record. To accomplish this, the output signal of the detector 25 is coupled by way of an amplifier 64 to a recorder 65 for progressively providing a continuous indication representative of the wall thickness of a tubular member passing through the inspection apparatus 10. As an additional feature, the circuitry 63 also includes a time-averaging circuit 66 appropriately tuned to average the output of the detector 25 for each revolution of source 43 to provide a second indication, as on a typical recorder 67, representative of the transverse cross-sectional metal area through that portion of the tubular member scanned in that revolution. In this manner, by driving the recorders 65 and 67 at speeds related to the axial speed of the pipe 16 past the apparatus 10, continuous meaningful records will be obtained of the actual metal thicknesses along the generally-helical inspection path around the pipe as well as of successive transverse cross-sectional metal areas along the length of pipe. The circuitry 63 further includes alarm indicators, as at 68 and 69, coupled to the recorders 65 and 67 and adapted for warning the operator of the apparatus 10 that the respective thickness and area measurements are less than some selected minimum value.

To provide the aforementioned calibration measurements, the circuitry 63 further includes a normally-open relay 70 which is appropriately connected to the solenoid actuator 60 and adapted to be closed when the shutter rod 46 is in its radiation-blocking position. In this shutter, when the radiation passage 45 is closed, the output of the detector 25 will be temporarily coupled by way of an adder 71, a follower 72, and an adder 73 to the amplifier 64 to provide an input signal at the recorder 65 that corresponds to the known thickness of the obturating portion 54 of the shutter bar 46. A selectively-adjustable reference signal, such as provided by a constant-voltage source 74 and a potentiometer 75, is coupled to the other input of the adder 71 for accurately resetting the recorder 65 before the first pipe that is to be inspected is passed through the thickness-measuring apparatus 10. Once this reference signal is correctly set, the potentiometer 75 is not changed until such time that the thickness-measuring apparatus 10 is again recalibrated.

For reasons that will subsequently be explained, the adder 71 is a signal-inverting adder so that the combination of the detector output signal and the reference signal will be inverted by the adder to provide a calibration signal. The calibrated output signal from the inverting adder 71 is stored by a capacitor 76 and, by employing the high-impedance follower 72, will remain as a fixed input to the adder 73 after the relay 70 is opened. It will be appreciated, therefore, that when the relay 70 is closed and the reference signal is applied to the inverting adder 71, the inversion of the signals by the adder 71 will provide an output signal from the adder 73 that equals only the reference signal. On the other hand, the signal initially stored by the capacitor 76 will be the inverted summation of the reference signal and the output signal of the detector 25.

Accordingly, once the reference signal has been properly set to obtain the correct reading at the recorder 65, the potentiometer 75 is left alone and the first pipe, as at 16, is inspected. As these measurements are being obtained, it will be appreciated that the output signal of the adder 73 will be equal to the algebraic summation of the reference signal and the difference in the output signals of the detector 25 at that moment and at the time that the recorder 65 was calibrated. Thus, the recorder 65 will, in effect, be recording the differences between the various wall thicknesses of the pipe 16 and the known thickness of the obturating portion 54 of the shutter bar 46. These readings can, of course, be presented either as a true thickness measurement or as a difference between this known thickness and the measurement.

Once the first pipe has been inspected, the shutter bar 46 will, of course, be moved again to its radiation-blocking position and the relay 70 will again be reclosed just before the next pipe is inspected. At this time, if there has been drifting of the detector 25, the calibration signal that is then stored on the capacitor 76 will be the inverted algebraic summation of the unchanged reference signal and the output signal of the detector which will be then produced as a result of any drifting. It will be recalled that the potentiometer 75 is not changed. Thus, with the relay 70 being reclosed, the output of the adder 73 will again be equal to only the original reference signal which will indicate that the circuitry 63 is still properly calibrated.

Once the next pipe is moved through the thickness-measuring apparatus 10 and the relay 70 is reopened, the resulting outptu signal from the adder 73 will again be equal to the algebraic summation of the reference signal and the difference in the output signals of the detector 25 at that moment and at the time the second calibrating signal was stored on the capacitor 76. Hereagain, the resulting signal recorded by the recorder 65 will be representative of the differences in the thicknesses of the pipe being inspected and the known thickness of the obturating portion 54 of the shutter bar 46.

It will be appreciated that a more-precise calibration signal can be stored in the capacitor 76 if the detector 25 is in a known position in relation to the radiation source 43 at that time. Accordingly, in the preferred embodiment of the thickness-measuring apparatus 10, means are provided for temporarily fixing the detector 25 in a selected position as the calibration measurements are being obtained.

Accordingly, as more fully explained in the aforementioned application Ser. No. 22,935, in the preferred manner of accomplishing this, selectively-operable clamping devices 77 and 78 (FIGS. 1 and 2) are arranged at opposite ends of the tubular member 32 and cooperatively arranged to secure the detector 25 in coincidental alignment with the inspection axis 17 as a calibration measurement is being obtained. In general, each of the clamping devices 77 and 78 is comprised of an opposed pair of horizontal bars, as at 79 and 80, which are respectively disposed above and below the conveyor 13 and operatively carried for vertical movement on suitable guides or uprights 81 stationed on opposite sides of the conveyor. Suitable devices, such as solenoid-actuators or hydraulic piston actuators as at 82 and 83, are operatively coupled to the clamping bars 79 and 80, respectively, and suitably arranged for moving the opposed bars in unison into clamping engagement on the respective end portions of the detector housing 29 for coaxially positioning the detector 25 therein when a calibration measurement is to be made. Once the calibration measurement is completed, the actuators 82 and 83 are reversed to return the clamping bars 79 and 80 to their normal positions so that the pipe 16 can freely pass through the clamping devices 77 and 78.

It will be appreciated, therefore, that the present invention has provided new and improved radiation apparatus for accurately and quickly measuring the wall thickness of elongated tubular members. By arranging the new and improved radiation detector to produce a uniform response to a narrow beam of radiation which may strike the detector at any of several locations on its active element, as a tubular member is advanced along an inspection axis and over the detector, the radiation beam intercepted thereby will produce an accurate response even though the detector is erratically moving and does not remain in coincidental alignment with the axis. Thus, by modifying the detector as described in detail herein, the detector will provide a substantially-constant signal for a given thickness of metal over a predetermined range of eccentricity from the inspection axis.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. An inspection system comprising: radiation-emitting means adapted to direct a radiation beam through a test speciman along a selected axis for producing a uniform radiation pattern of known dimensions on a distant transverse plane intersecting said beam axis; and radiation-detecting means including a radiation-sensitive element having an active portion and adapted for movement along said plane between a normal position uniformly located in relation to said radiation pattern and at least one other position spaced from said normal position and located eccentrically in relation to said radiation pattern, said active portion of said radiation-sensitive element being cooperatively shaped for producing uniform output signals representative of at least one radiation-responsive characteristic of such a test speciman upon movements of said radiation-sensitive element between said spaced positions.

2. The inspection system of claim 1 wherein the transverse dimension of said active portion of said radiation-sensitive element crossing said spaced positions and cut by said plane is greater than the spacing between said spaced positions, and the dimensions of said active portion of said radiation-sensitive element perpendicular to said plane which are disposed along said transverse dimension are selectively varied in relation to said spacing for producing said uniform output signals.

3. The inspection system of claim 2 wherein the perpendicular dimension of that part of said active portion of said radiation-sensitive element which is in said radiation pattern when said radiation-sensitive element is in its said normal position is less than the perpendicular dimension of that part of said active portion of said radiation-sensitive element which is in said radiation pattern when said radiation-sensitive element is in its said other position.

4. The inspection system of claim 3 wherein the perpendicular dimensions of those parts of said active portion of said radiation-sensitive element lying between two said parts vary successively between said two parts.

5. The inspection system of claim 2 wherein said active portion of said radiation-sensitive element is a hollow cylinder with its longitudinal axis lying in said plane and transversely oriented to the direction of said movements and having its outside and inside diameters cooperatively sized for producing said uniform output signals upon said movements of said radiation-sensitive element between its said spaced positions.

6. The inspection system of claim 5 wherein said active portion of said radiation-sensitive element is a scintillation crystal.

7. The inspection system of claim 2 wherein said radiation-emitting means are cooperatively arranged for maintaining the sides of said radiation beam substantially parallel at least between locations spaced above and below said plane a distance about equal to said spacing for also producing uniform output signals upon movements of said radiation-sensitive element between its said spaced locations.

8. The inspection system of claim 2 wherein said beam axis perpendicularly intersects said plane.

9. Apparatus adapted for measuring the wall thickness of elongated tubular members and comprising: means adapted for axially moving an elongated tubular member along a predetermined inspection axis; focussed radiation-emitting means adapted to be positioned exterior of a tubular member moving along said inspection axis and cooperatively arranged to direct a radiation beam along a selected radiation axis intersecting said inspection axis for producing a uniform radiation pattern of a selected area at the intersection of said axes; and radiation-detecting means including a radiation-sensitive element having an active portion and adapted for loose reception within a tubular member moving along said inspection axis so as to be movably positioned in said radiation pattern at said intersection for producing output signals representative of the well thickness of a tubular member moving along said inspection axis, said active portion of said radiation-sensitive element being cooperatively shaped for producing uniform output signals for a given wall thickness and material of a tubular member moving along said inspection axis upon random movements therein of said radiation-sensitive element between a normal position on said inspection axis where said active portion of said radiation-sensitive element is uniformly located in relation to said radiation pattern and other positions where said active portion of said radiation-sensitive element is eccentrically located in relation to said radiation pattern.

10. The apparatus of claim 9 wherein said active portion of said radiation-sensitive element is a scintillation crystal having its dimensions perpendicular to said inspection axis cooperatively sized for producing said uniform output signals as said radiation-sensitive element moves randomly within a tubular member moving along said inspection axis.

11. The apparatus of claim 9 wherein said active portion of said radiation-sensitive element is a scintillation crystal formed as a hollow cylinder and normally coincidentally aligned with said inspection axis so as to be responsive to inwardly-directed radiation from multiple radial directions; and further including means adapted for moving said radiation-emitting means to selected angular positions about said inspection axis for selectively scanning selected wall portions of a tubular member moving along said inspection axis to provide corresponding indications characteristic of the thicknesses of such scanned wall portions.

12. The apparatus of claim 11 wherein said axes perpendicularly intersect one another.

13. The apparatus of claim 11 further including: means adapted to average a succession of said thickness indications for providing additional indications representative of the cross-sectional metal areas of such scanned wall portions.

14. Apparatus adapted for measuring the wall thickness of elongated tubular members and comprising: means adapted to support an elongated tubular member for axial movement along a selected inspection axis; a body of radiation-attenuating material adapted for rotation about a tubular member moving along said inspection axis and including at least one chamber therein spatially disposed from said inspection axis; a source of radiation in said chamber; radiation-focussing means on said rotatable body including at least one radiation passage arranged therein in alignment between said radiation source and a selected point of intersection with said inspection axis to direct an inwardly-directed narrowly-focussed radiation beam toward said inspection axis for producing a substantially-uniform radiation pattern of a selected dimension extending transversely across said point of intersection; and a radiation detector adapted for loose reception in a tubular member moving along said inspection axis and including a radiation-sensitive scintillation crystal having a transverse dimension greater than said transverse dimension of said radiation pattern and cooperatively-shaped portions respectively arranged for producing substantially-uniform output signals as said radiation detector moves randomly between eccentrically-located positions in relation to said radiation pattern within a tubular member of a given wall thickness and material moving along said inspection axis.

15. The apparatus of claim 14 wherein the plane of revolution of said radiation beam is generally perpendicular to said inspection axis.

16. The apparatus of claim 14 wherein the opposite sides of said radiation passage are substantially parallel so that said radiation beam will be of substantially-uniform size within the interior bore of a tubular member moving along said inspection axis for also producing substantially-uniform output signals whenever said radiation detector moves randomly toward and away from said radiation source within a tubular member of a given wall thickness and material moving along said inspection axis.

* * * * *